Sept. 23, 1969    L. L. BALASSA    3,468,789
PROCESSING OF VISCOUS OIL EMULSIONS
Filed April 22, 1965    3 Sheets-Sheet 2

FIG. 2

INVENTOR.
LESLIE L. BALASSA
BY
*Darley & Darley*
ATTORNEYS

Sept. 23, 1969 L. L. BALASSA 3,468,789
PROCESSING OF VISCOUS OIL EMULSIONS
Filed April 22, 1965 3 Sheets-Sheet 3

FIG. 3

INVENTOR.
LESLIE L. BALASSA
BY
ATTORNEYS

United States Patent Office 3,468,789
Patented Sept. 23, 1969

3,468,789
PROCESSING OF VISCOUS OIL EMULSIONS
Leslie L. Balassa, Creighton Lane,
Scarborough, N.Y. 10510
Filed Apr. 22, 1965, Ser. No. 450,057
Int. Cl. C10g 33/04
U.S. Cl. 208—188                                       24 Claims

ABSTRACT OF THE DISCLOSURE

There is described processes for obtaining an oil product substantially free of water and mineral matter from water-containing oil emulsions which comprises contacting the oil emulsion with a solvent which is a solvent for the oil and the petroleum components therein and azeotropically dehydrating the emulsion to remove the water therefrom as an azeotropic distillate. The process also provides for recovery of oil from any oil-wet mineral matter which separates out from the dehydrated oil product as well as the recovery of any oil in the aqueous phase of the oil emulsion. The process has particular application in the treatment of oil emulsions obtained from bituminous oil-bearing sources such as those derived from the Athabasca oil fields.

This invention relates a process of dehydrating and demineralizing oil emulsions. More particularly, the invention is concerned with a method of processing oil emulsions resulting from the separation of oil from petroleum oil-bearing sources.

It is an all too frequent occurrence in the production of oil, that the oil recovered from the well is actually a viscous oil emulsion which can be processed further only by complicated and relatively expensive procedures and with great loss of time and effort. Bituminous oils, especially those which are produced by the water flood, hot water, or by the pressure steam or steam injection processes, almost invariably result either in water-in-oil or oil-in-water emulsions which cannot be processed by conventional emulsion breaking methods.

An even more difficult processing condition arises in the case of high gravity bituminous oils which, independent of the method by which they were produced, carry not only water but also a substantial percentage of both coarse and very fine particle size sand, clay and silt, which effectively stabilize the oil emulsion to an even greater extent than is the case with the mineral-free oil emulsions discussed above. These bituminous oils frequently have a specific gravity of between 1.00 and 1.40. Since these oils are also very viscous, they cannot be separated from the water or from the mineral matters by settling or by the use of even the most efficient centrifuges. Diluting the oils with suitable solvents, such as kerosene, solvent naphtha, benzene, etc., will cut the specific gravity of the solution below that of water and lower the viscosity to a point where a substantial proportion of the water and the mineral matters can be removed from the emulsions by sedimentation or by the use of a centrifuge, or a hydrocyclone. Sedimentation by gravity or by the employment of devices which increase the rate of sedimentation do not solve the problem, even in the case of highly dilute solutions of the oils, because the water content of the oils remains far above acceptable limits. This problem is even worse in the case of the mineral matters in the oils such as result from oils produced in the Athabasca oil fields of Alberta, Canada.

In processing the oil emulsions obtained from the Athabasca oil fields, another difficulty is encountered when the aqueous phase is separated from the oil phase upon dilution. The oil phase carries a substantial percentage of very small particle size clay and silt (sand) which remains in suspension even after prolonged storage. The aqueous phase also has some oil-wet clay particles which are, at least partly responsible for the unusual stability of the suspension exhibited by the mineral matters. The stable suspension of mineral matters and the oil content of the aqueous phase makes it unsuitable for recycling in the processing operation or even discharging it into the surface waters. Also the dewatered mineral matters, which contain a substantial percentage of oil, are very difficult to dispose of even when they are to be returned to the same place from where they were mined or produced.

Therefore, the heretofore utilized processes were unsatisfactory and inefficient from a commercial standpoint because a substantial percentage of oil was not recoverable either from the aqueous phase of the oil emulsion or the dewatered mineral matters. Furthermore, the prior art processes were unsatisfactory because the water and mineral content of the processed oil was above acceptable limits for refining processes.

I have discovered that the difficulties encountered with the prior art processes can be overcome by the use of hydrocarbon solvents which are good solvents for the bituminous oils and the bituminous components in the oils and form minimum-boiling-point binary azeotropes with water.

Accordingly, the present invention relates to a process whereby oil emulsions, either of the water-in-oil or oil-in-water type, are separated into their oil, water and mineral constituents more simply, efficiently and economically.

The invention provides a process whereby the oil emulsion is separated into its constituents by using hydrocarbon solvents which are good solvents for bituminous oils with all the bituminous components therein, and form minimum-boiling-point binary azeotropes with water.

The invention also provides a continuous process, which will permit the hydrocarbon solvent used to be returned to the process for recycling.

The invention further provides a process whereby the constituents of the oil emulsion are substantially completely separated from each other.

These and other aspects of the invention will become apparent from a consideration of the following detailed description taken in conjunction with the accompanying drawings which are flow sheets illustrating the features of this invention.

The selection of a suitable hydrocarbon solvent is limited only to the extent that the solvent be a solvent for all the components of the oil and also form a minimum boiling point azeotrope with water. The preferred solvents are aromatic hydrocarbons including benzene, toluene, xylene, ethyl benzene and their mixtures with each other or with other aromatic or aliphatic hydrocarbons. The enumerated solvents, and in particular xylene are excellent solvents for the bituminous fractions in the oil emulsion such as the asphaltenes.

According to this invention, when an oil emulsion, obtained by the steam-injection method from the Athabasca oil field and having a water content of about 30%, is diluted with a quantity of toluene about equal in weight with that of the oil emulsion, there is obtained a low viscosity blend or solution which within a few hours formed three layers as follows:

(1) Top layer.—Oil phase containing about 5% water and 3% fine particle size mineral matters collectively called "silt."

(2) Second layer.—This layer is a relatively narrow layer at the interface of the oil-solvent phase and the aqueous phase (bottom layer). This layer cannot be sharply differentiated from either of the other two layers because it contains a substantial proportion of oil globules mixed with oil-wet silt flocks suspended in the continuous aqueous phase.

(3) Bottom layer.—Aqueous phase consisting of a sediment of rather coarse sand and silt and a suspension of small particle size silt. The sediment contains some oil-wet silt flocks which are heavier than water.

(A) Processing of the top layer

The oil phase which is a solution of bituminous oil in toluene (or other hydrocarbon solvent capable of forming azeotropes with water) contains usually about 3 to 7% of water by weight and about 2 to about 8% silt. Neither the water nor the silt can be separated from the solution by settling or by centrifuging. The solution can be dehydrated by azeotropic distillation either at atmospheric or at reduced pressure, thereby removing the water as the toluene azeotrope at temperatures between about 60° and about 150° C. depending on the pressure prevailing during the distillation. The azeotrope removes the water quantitatively from the oil phase. The dehydrated solution contains after the distillation only the bituminous oil, suspended oil-wet silt and toluene solvent.

Within a few hours, the oil-wet silt settles out of the dehydrated oil solution, forming a thin, sharply defined sediment which can be readily separated from the supernatant liquid either by decantation or by filtration. The silt sediment can be completely freed from the oil by washing it with toluene. The toluene remaining in the silt after washing can be stripped from the silt either by steam, preferably by dry steam, or by heating the silt in a closed retort. The wash liquids containing only oil and toluene, may be combined with the silt-free oil-solvent solution. The toluene stripped from the silt by steam, may be combined with the azeotrope distillate collector decanter.

The oil toluene solution, freed of both water and suspended silt, is stripped of the high cost toluene solvent by distillation. In order to make the toluene-free oils suitable for pipe-line acceptance or for refinery use, the toluene is replaced either during or after the distillation, with sufficient low cost petroleum distillate to assure satisfactory flowing properties to the resulting oil.

(B) Processing of the second layer

This layer is an unstable mixture of: (1) the discontinuous oil phase, (2) the continuous water phase and, (3) substantial quantities of largely oil-wet silt flocks. This layer cannot be completely separated from either the oil phase or the water phase by mechanical means.

This layer may be combined with the oil phase top layer of A and stripped of the water azeotropically. When the water is removed, the oil from the silt flocks is dissolved by the toluene and the deflocculated silt then settles to the bottom with the rest of the silt. This is the simplest procedure for processing this layer.

As an alternative, this layer may be handled in a separate still, in which case the azeotrope is combined with the azeotrope from A, the decanted or filtered oil phase with the oil phase of A and the silt with the silt from A.

A third approach to the handling of this layer is to treat it with toluene under pressure and agitation at about 150° C. and then cooling it to ambient temperature. This treatment removes the oil from the silt flocks. The oil-free silt will settle to the bottom of the water phase while the toluene-oil solution will form a top layer. The top layer can now be removed by decanting and then combined with the oil phase of A before dehydration. The aqueous bottom layer containing mostly water with some dissolved toluene and settled silt, is now stripped of the toluene with steam and then separated from the silt by decanting. The toluene obtained after stripping it from the water, may be recycled in the process. The water stripped of the solvent is of high purity and may be recycled in the hot water, pressure steam or steam injection processes employed to recover oils from bituminous oil-bearing sources. The water is also suitable for use as boiler feed. The silt sediment may be dried and combined with the silt obtained from A. The silt is of sufficiently fine particle size to be suitable for use in the ceramic, glass or paint industries.

(C) The aqueous phase bottom layer

This layer contains: (1) largely water from the emulsion, (2) a small amount of toluene solvent dissolved in the water, (3) fine particle size water-wet silt in a stable suspension, and (4) coarse particle size water-wet silt sediment mixed with a small proportion of partly wet silt flocks in the sediment.

This layer may be processed by treating with toluene under pressure similarly to the "third approach," described with respect to layer B. This treatment also causes sedimentation of the silt suspension, which results in a water which is suitable either for recycling as indicated above or discarding in the surface waters. The silt being freed from the oil, may be dumped back into the place from where it was produced or spread or piled any place desired without danger of causing contamination by the oil or spontaneous combustion.

Another approach to the processing of this layer is to remove the oil-wet silt flocks either by straining, which would retain them but pass the water-wet silt, or utilize screens or separators which preferentially attract the oil-wet flocks due to their surface tension. The oil-wet flocks can then be combined with layer B. The toluene is stripped from the water by steam and the suspended silt flocculated by any suitable means, such as lowering the pH of the suspension with $SO_2$, $HCl$ or $H_2SO_4$, or first adding some sodium silicate solution followed by acidulation or treatment with alum to effect flocculation. The use of polyacrylates or polyacrylamide flocculants are sometimes of assistance in the case of very stable suspensions of silt.

The most simple and mot practicable method for handling the oil emulsion is to dissolve the emulsion with toluene or other solvent capable of forming an azeotrope with water, and without waiting for the solution to separate into layers, subject it to azeotropic distillation, removing all the water. During this distillation additional solvent may be introduced in liquid or vapor form to assure complete dehydration. The oil-wet silt then can be readily removed from the dehydrated solution either by settling or by means of a centrifuge. The silt is freed of all traces of oil by washing with solvent. The resulting solvent wash containing the traces of oil recovered from the silt is combined with the dehydrated oil-solvent solution. The oil-free wet silt is then stripped of the solvent with steam or heat. The silt is discarded. The stripped solvent is a solvent-water condensate which may be combined with the azeotropic distillate obtained from the dehydration of the oil emulsion or transferred to the distillation column where the azeotropic distillation is carried out.

The solvent is stripped from the oil-solvent solution by distillation. The azeotropic solvent is replaced in the solution by a low cost oil distillate diluent. The solvent stripped above, is recycled. The oil-diluent solution is ready for the pipe-line or the refinery.

The azeotropic distillate of solvent and water is collected in a decanter and separates into a solvent and aqueous phase. The solvent may be recycled together with the solvent from the oil solution.

The aqueous phase in the decanter is stripped of the solvent dissolved in it, by steaming it. The steam stripped solvent is combined with the solvent phase in the decanter. The solvent free water is a pure condensate water and is recycled either as process water used to recover oils from bituminous oil-bearing sources, or as boiler feed.

This simplified procedure for separating the oil, water, and solid constituents from the oil emulsion is largely due to the elimination of layer B. This is achieved by not waiting for the solution to separate into the three layers discussed above.

The above described procedures may also be employed to separate oil-in-water emulsions containing a substantially high percentage of water in the emulsion.

The processing of oil emulsions according to the present invention is even more simplified where the oil emulsion contains only water and no mineral matters in quantities which interfere with the refining processes. These virtually mineral-free oil emulsions are exemplified by those produced in the California oil fields by the steam injection method. Such emulsions may be processed by diluting the emulsion with a solvent, capable of forming an azeotrope with water, in a suitable mixing vessel.

Additional solvent may be added during the dehydration step in liquid or vapor form to assure complete dehydration. The use of solvent vapors will reduce the quantity of solvent initially required to be added to dilute the emulsion. The emulsion solution is dehydrated in a distillation column by means of azeotropic distillation. The azeotrope is collected in a decanter.

The dehydrated oil-solvent phase is stripped of the azeotropic solvent in a still and the solvent is replaced by a low cost diluent to control the viscosity of the resulting oil solution.

The oil-diluent solution is ready for delivery to the pipeline or to the refinery. The azeotrope collected in the decanter separates into a solvent and an aqueous phase. The solvent may be decanted and recycled. The aqueous phase is stripped of the solvent dissolved in it by steaming it. The solvent-water distillate is collected in the decanter. The water stripped of the solvent is of high purity and may be recycled for use in recovering oils from bituminous oil-bearing sources and even used as boiler feed.

The following examples of the processes which may be employed in accordance with the invention are recited as illustrative and it is to be understood that the invention is not intended to be limited thereby. All percentages are by weight unless otherwise indicated.

Example 1

The oil emulsion used in this example was 1000 grams of "oil froth" obtained by an alkaline steam process from the Athabasca tar sands of Athabasca, Alberta Province, Canada.

The sample used contained about 40% of water and about 12% sand and silt, both coarse and fine particle size. The sample was a very high viscosity water-in-oil type emulsion. A small part of the internal aqueous phase broke out of the emulsion and was available for testing. The pH of the aqueous phase was about 12, due to the use of sodium hydroxide in the extraction process.

The emulsion was mixed at room temperature with toluene of about equal weight with the whole emulsion. A low viscosity emulsion was obtained from which a substantial part of the aqueous phase together with some of the silt and sand settled out.

Figure 1:
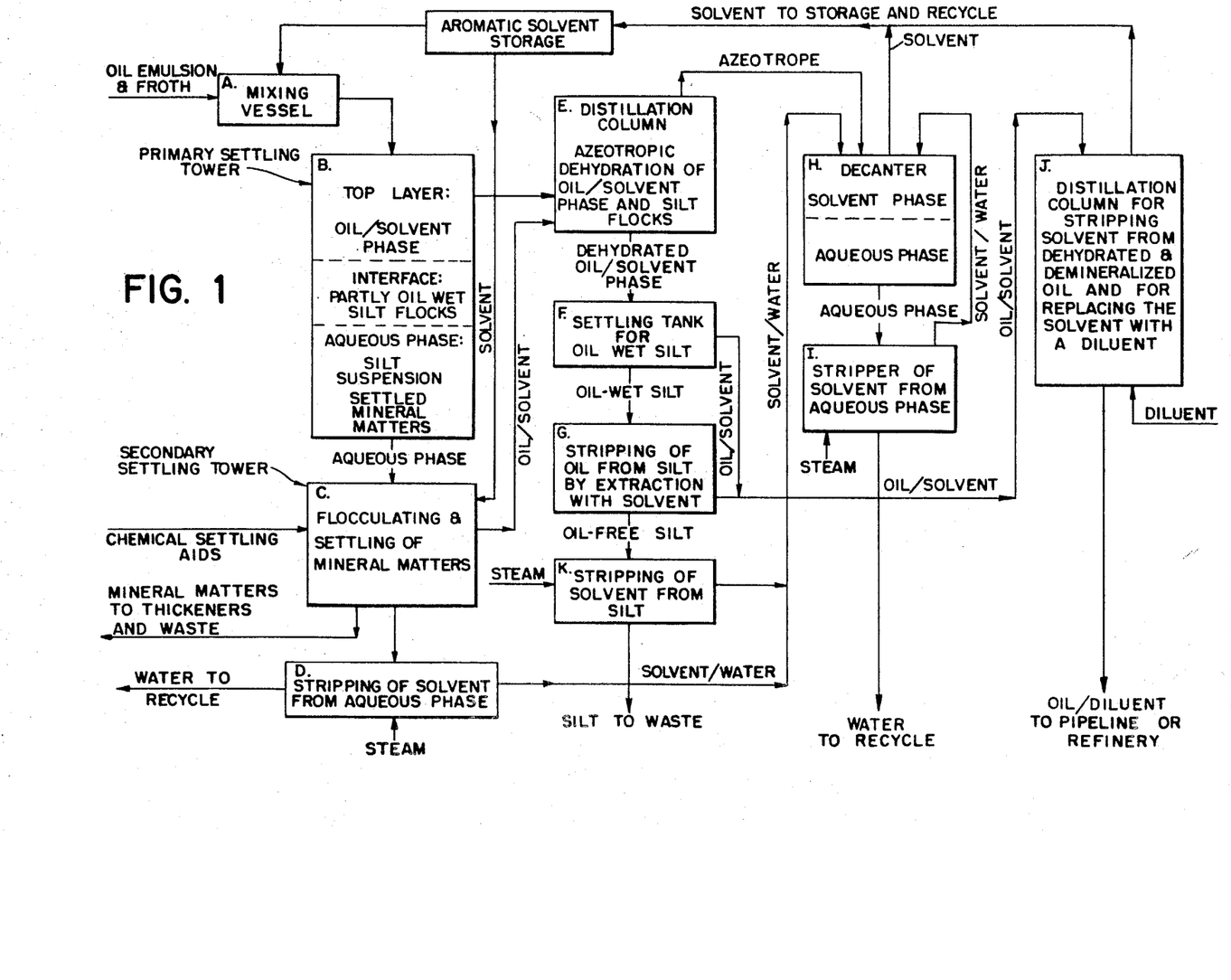

The processing of this emulsion follows the general outline represented by the flow diagram in FIGURE 1. As shown in this figure, the diluted emulsion in mixing vessel A formed three layers in primary settling tower B which could be separated by decanting. The top layer consisting of the oil-solvent phase with about 6% water and 4% fine particle size silt. The interface layer consisted of a substantial proportion of oil-wet silt flocks, the discontinuous oil phase and the continuous water phase. This interfacial layer could not be readily separated from the oil-solvent phase and, therefore, these two layers were processed together by subjecting them to an azeotropic distillation, in order to dehydrate the mixture which carried a total of 12% water and 8% silt. This distillation was carried out in distillation column E and the azeotrope was collected in decanter H.

The oil-solvent phase carrying the suspended silt, which due to the dehydration, released the oil and became deflocculated, was transferred into settling tank F. The silt settled out after standing overnight. The oil-solvent phase was decanted and transferred to distillation column J, where the solvent was stripped by distillation and was replaced by kerosene diluent in the amount of 30% by weight of the oil present. The kerosene solution was now ready for the pipeline or for refining.

The settled silt from settling tank F was transferred to extractor G where the oil was stripped from the silt by extraction with solvent. The oil-solvent solution from G was combined with that from F and processed together in J.

The now oil-free but solvent wet silt in extractor G was transferred to pressure vessel K and stripped of the solvent by steaming it with dry steam at about 2 lbs. gage pressure. The solvent-water condensate was transferred to decanter H.

The dry and very small particle size silt, which is useful in the rubber, paint, and ceramic industries, was then discarded in the waste. The silt was virtually free of oil and solvent and comprised over 90% silica sand particles.

The aqueous phase, which is the bottom layer of primary settling tower B, comprises: (1) about 70% water, with some of the solvent present in the water in solution, (2) about 28% water-wet sand and silt, some of the silt in stable suspension, and (3) about 2% partly oil-wet silt flocks mixed with the silt sediment. The aqueous phase from primary settling tower B was transferred to secondary settling tower C and after adding about 5% by weight toluene solvent, calculated on the water present, it was heated under 10 lbs. gage pressure and under vigorous agitation for about 10 minutes to effectively remove the oil from the oil-wet silt flocks. The content of C was then cooled to ambient temperature and allowed to settle and to separate into an oil-solvent phase top layer and an aqueous phase bottom layer. The oil-solvent phase was decanted and transferred to distillation column E and combined with the oil-solvent phase obtained from B.

The mineral matters were then removed by filtration, washed with water and discarded in the waste. The aqueous phase, freed of the mineral matters, and combined with the wash waters from the filter, was then transferred to stripper D where it was stripped of the solvent by steaming under slightly elevated pressure. The stripped solvent-water condensate was transferred to decanter H.

The aqueous phase of decanter H was transferred to stripper I and stripped of its dissolved solvent content by steaming at slightly elevated pressure. The solvent-water condensate from stripper I was returned to decanter H. The solvent-free water from stripper I was of high purity and suitable for recycling either as process water, as heretofore described, or as boiler feed.

The top layer from decanter H was essentially pure solvent with a very small fraction of a percent of dissolved water and was suitable for recycling and, therefore, it was transferred to the solvent storage.

The following results were obtained from the 1000 grams of oil froth introduced into mixing vessel A:

|  | Percent of calculated |
|---|---|
| Oil, containing 0.2% silt and 0.1% water | 98 |
| Solvent recovered | 96 |
| Water recovered, suitable for recycling | 82 |
| Mineral matters—silt, oil content 0.3% | 98 |

Example 2

The process of Example 1 was repeated with xylene as the solvent and a high boiling petroleum distillate as the diluent. Substantially the same results were obtained.

Example 3

The process of Example 1 was repeated with the following modification:

The aqueous phase in secondary settling tower C was treated with $SO_2$ to lower its pH to about 5 in order to speed settling of the suspended silt. The silt in this case settled in 12 hours, whereas the aqueous phase of Example 1, having a pH of about 12, took two weeks to settle.

Example 4

The process of Example 3 was repeated except that hydrochloric acid was used to reduce the pH of the aqueous phase to about 3. The silt in this case settled in about 10 hours.

Example 5

The process of Example 3 was repeated with the following modification: There was added 1% of a 25% solution of sodium silicate to the aqueous phase, mixed thoroughly and then acidified with sulfuric acid to a pH of about 3. The silica gel formed increased further the speed with which the suspended silt settled to about 6 hours.

Example 6

The process of Example 3 was repeated with the following modification: The silt was flocculated at a pH of about 4, with a polyacrylamide flocculating agent being used to accelerate the settling of the silt. In this example, the flocculating agent was used as "Separan NP 10," a product of Dow Chemical Co., in an amount of 0.05% of the total aqueous phase present.

Example 7

The process of Example 1 was repeated with the following modifications: 1000 grams of oil froth was mixed with the aromatic hydrocarbon solvent in mixing vessel A at a temperature between 130 and 150° C. A rapid solution of the emulsion was obtained and with an almost complete absence of the oil-wet silt flocks in the primary settling tower A. A clear separation of the oil-solvent phase from the aqueous phase resulted. It was also observed in this case that the silt suspension settled more rapidly, without chemical treatment, than was the case in Example 1.

Also in this case the treatment of the aqueous phase in secondary settling tower C with solvent was omitted as there was no oil-wet flocks of silt in the sediment.

Example 8

Figure 2:
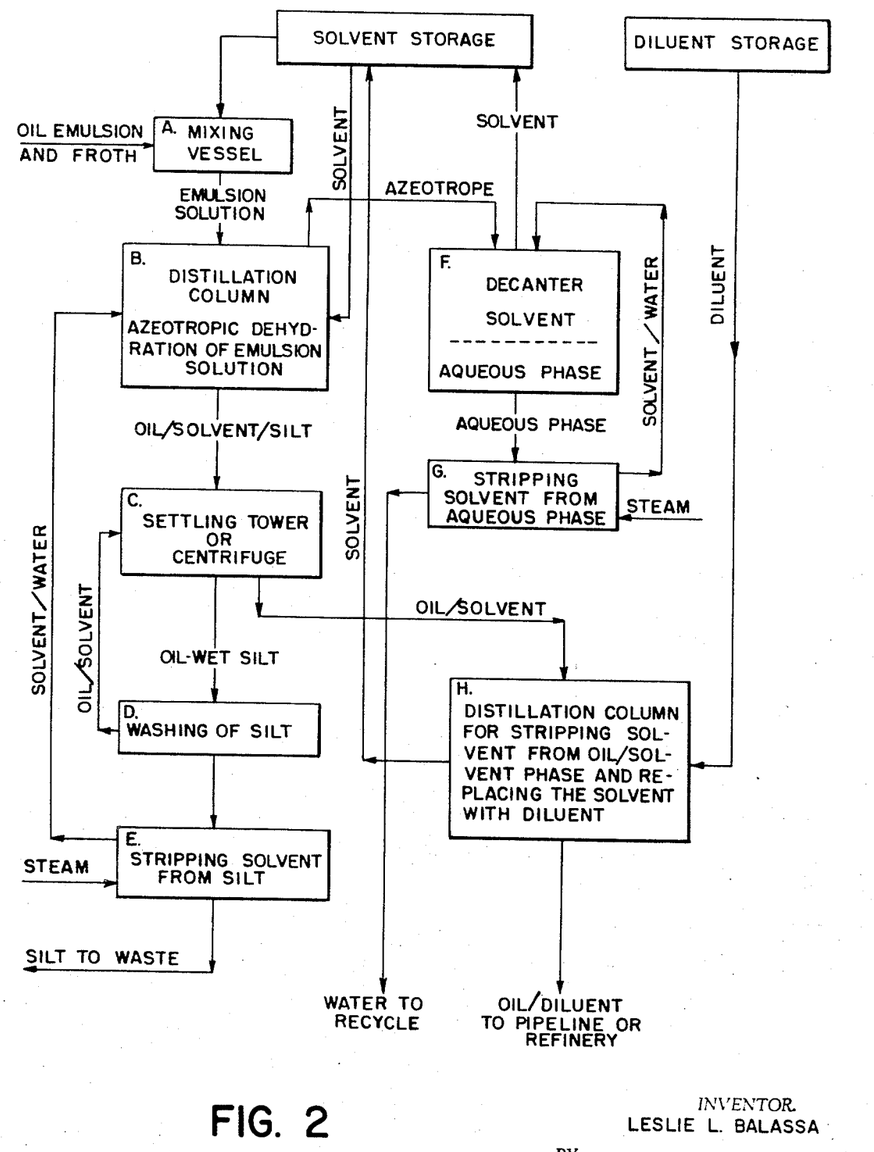

The process of this example is illustrated by the flow diagram in FIGURE 2.

The oil emulsion (Athabasca oil emulsion froth) was the same as used in Example 1. One thousand grams of the emulsion was mixed with equal weight of toluene in mixing vessel A, at 140° C. under pressure. The emulsion solution is transferred to distillation column B where, without allowing the separation of the aqueous phase, the water is removed by azeotropic distillation and collected in decanter F. Sufficient quantity of additional solvent is introduced into the still to assure complete dehydration of the material.

The oil-solvent phase with suspended oil-wet silt, in distillation column B, was transferred to settling tower C where the silt settled to a thin and sharply defined sediment in about 18 hours.

The silt sediment, containing all the mineral matters of the original emulsion froth, was washed with solvent in D and then the solvent stripped with steam in E. The silt from E with an oil content of less than 0.2% was discarded as waste.

The solvent-water condensate from E was transferred to B to be dehydrated.

The oil-solvent wash liquid from D was transferred back to C to free it from any silt that might have been carried with it.

The oil-solvent phase from C was transferred to H where the solvent was stripped by distillation and replaced with about 30% diluent, calculated on the weight of the oil present, in order to obtain an oil solution suitable for pipeline transportation or for the refinery. The solvent from H was transferred to the solvent storage for recycle.

The azeotropic distillate which was collected in decanter F separated into an aqueous phase of water with some solvent dissolved in it. This aqueous phase was decanted and stripped of the solvent by means of steam in stripper G. The solvent-water condensate from G was returned to decanter F. The solvent from decanter F was transferred to solvent storage for recycle in the process.

The water from stripper G, representing azeotropic and steam distillate freed from the solvent, is of high purity and is ready for recycle or for boiler feed.

More than 98% of the oil, the solvent and the water present in the emulsion, or introduced in the process, were recovered in the yield. The oil contained less than 0.2% silt or water. The discarded silt contained less than 0.2% oil.

Example 9

This example demonstrates a process suitable for the dehydration of virtually mineral-free oil emulsions such as those produced in the California oil fields by the steam injection method. The process follows the general outline represented by the flow diagram in FIGURE 3.

Figure 3:
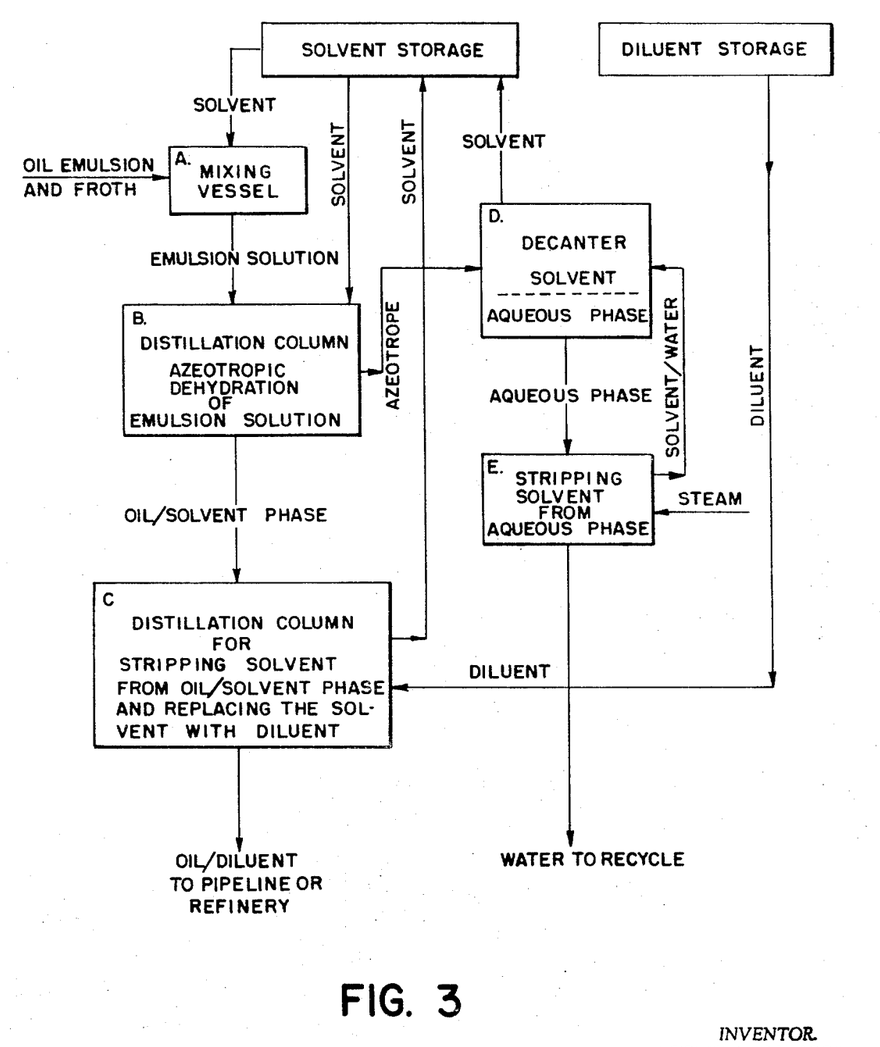

The emulsion (1000 grams) was dissolved in xylene solvent in mixing vessel A at about 80° C. The emulsion solution was dehydrated by azeotropic distillation in B. Additional solvent was introduced to assure complete dehydration. The azeotropic distillate was collected in decanter D.

The oil-solvent phase from B was stripped of the solvent by distillation in C. The solvent was partially replaced by diluent to assure flowing consistency for the oil product. The oil-diluent solution is ready for the pipeline or for the refinery. The solvent from C is transferred to storage for recycling.

The aqueous phase from the decanter D is stripped of dissolved solvent by steam in stripper E. The solvent-water condensate is returned to decanter D. The water from E is condensate and is recycled in the process or used as boiler feed. The solvent from decanter D is transferred to solvent storage for recycle.

Again more than 98% of the oil, solvent and the water present in the emulsion, or introduced in the process were recovered in the yield. The oil obtained contained less than 0.2% water.

Example 10

The oil emulsion used in this example was a very high viscosity oil-in-water type emulsion. The sample used contained about 70% water and about 12% sand and silt. This emulsion was mixed with toluene of about equal weight with the oil in the emulsion. The diluted emulsion was processed according to the procedure employed in Example 1.

Example 11

The process of Example 9 was repeated with the following modifications: The oil emulsion (1000 grams) was heated to a temperature of about 90° and introduced into the azeotropic distillation column B. There was introduced into the distillation column B, containing the heated oil emulsion, xylene vapors at a temperature of about 150°. The xylene vapors formed an azeotrope with the water at this temperature. The azeotropic distillate was collected in decanter D.

The oil product recovered from B was substantially free of solvent because the temperature during the distillation in B was kept sufficiently high to prevent condensation of the vapors in the distillation column. Hence, there was recovered an oil product substantially free of solvent, water and mineral matter. A diluent can be added to the oil product to insure flowing consistency, and the oil-diluent solution is ready for the pipeline or the refinery.

The azeotropic distillate recovered from B is processed as in Example 9.

The above examples are illustrative of the processes of the present invention. Other modifications of the processes illustrated by the examples and the flow diagrams are possible. Thus, for example, all of the processes of the present invention can be carried out by either eliminating completely the dilution of the oil emulsion prior to the azeotropic distillation of the water in the emulsion or at least substantially reducing the quantity of solvent which is employed to initially dilute the oil emulsion. This modification is carried out by heating the oil emulsion prior to its introduction into the distillation column and introducing into the distillation column solvent vapors at elevated temperatures. The use of solvent vapors into the distillation column rather than solvent liquid substantially reduces the quantity of solvent necessary for processing the oil emulsion. If the solvent is introduced as vapor in the distillation column, it can be permitted to condense in the column, thereby obtaining an oil-solvent solution free of water. Preferably, however, the temperature in the distillation column is maintained sufficiently high so that the solvent vapors do not condense, thereby obtaining an oil product which is free of solvent. This preferred procedure eleminates the additional step of having to remove the solvent from the water-free oil product.

In adding the solvent vapors to form an azeotropic distillate with water, it has been found that the temperature necessary to form the azeotrope is about 140° to about 150°, this temperature being substantially higher than the temperature at which a system containing only the solvent and water would form an azeotrope. Thus, for example, xylene and water form an azeotrope at a temperature of about between 90 to 95° C. Yet, when xylene vapors are employed, an azeotrope is formed at a temperature of about 150° C., this being due to the presence of the oil emulsion which substantially raises the temperature at which the azeotrope will form.

Furthermore, other modifications of the processes of the present invention can be utilized. For example, a low-cost diluent can be used to dilute the oil emulsion which is introduced into the distillation column. The use of a diluent substantially reduces the quantity of costly solvent required to process the oil emulsion.

Although the present invention has been described in conjunction with preferred embodiments, the process can also be successfully employed to process oil emulsions obtained by other methods than steam or hot water processes. For example, the "cold water method" known in the art as "water flooding" for recovering oils also results in water-in-oil emulsions which can be processed according to the present invention. Thus the applicability of the present invention is not limited to oil emulsions obtained from a particular source such as bituminous sands.

It is to be understood that modifications and variations of the invention may be resorted to without departing from the spirit and scope thereof. The scope of the invention is defined by reference to the claims.

What is claimed is:
1. A method of processing water and mineral matter containing oil emulsions obtained from bituminous oil-bearing sources, which method comprises:
 (a) mixing said oil emulsion containing said mineral matter with at least one hydrocarbon solvent which is capable of dissolving substantially all of the bituminous constituents in said oil emulsion;
 (b) heating said mixture of said emulsion and said solvent to azeotropically dehydrate said oil emulsion thereby removing water from said emulsion as a constant boiling mixture in the vapor phase comprising said water and said solvent, said constant boiling mixture containing a greater quantity of said solvent than said water and recovering a substantially dehydrated oil product from said mixture;
 (c) removing any solvent present in said dehydrated oil product and in said azeotropic distillate and
 (d) mechanically separating the oil-wet mineral matter contained in said dehydrated oil product from said oil product.

2. A method according to claim 1 wherein said solvent is placed in contact with said oil emulsion by diluting said oil emulsion prior to said azeotropic dehydration.

3. A method of processing water and mineral matter containing oil emulsions obtained from bituminous oil bearing sources which method comprises:
 (a) heating said oil emulsions containing said mineral matter and a hydrocarbon solvent in vapor form which is capable of dissolving the bituminous components in said oil emulsion to azeotropically dehydrate said oil emulsion, thereby removing water from said emulsion as a constant boiling mixture in the vapor phase comprising said water and said hydrocarbon solvent, said constant boiling mixture containing a greater quantity of said solvent than said water and recovering a substantially dehydrated oil product from said emulsion;
 (b) removing any solvent present in either of said dehydrated oil product and in the azeotropic distillate; and
 (c) mechanically separating the oil-wet mineral matter contained in said dehydrated oil product from said oil product.

4. A method according to claim 3 wherein said emulsion and said solvent vapor are maintained at elevated temperatures sufficient to prevent substantial condensation of said solvent vapor thereby recovering said dehydrated oil product substantially free of said solvent.

5. A method of processing water-containing oil emulsions obtained from bituminous oil-bearing sources, which method comprises:
 (a) diluting the oil emulsion with an aromatic solvent which is capable of substantially dissolving the bituminous constituents in said oil emulsion and forms an azeotrope with water;
 (b) stripping an azeotropic mixture of said solvent and water from said diluted oil emulsion of (a) to remove the water, thereby obtaining an oil-solvent solution and withdrawing the oil-solvent solution;
 (c) collecting the azeotropic distillate obtained from (b) said distillate comprising a solvent phase and an aqueous phase, and stripping said solvent from said aqueous phase;
 (d) mechanically separating any oil-wet mineral matter from said oil-solvent solution, withdrawing said oil-solvent solution substantially free of water and said mineral matter and removing the oil from any oil-wet mineral matter separated from said oil-solvent solution by washing said oil-wet mineral matter with a solvent and recovering an oil-solvent solution; and
 (e) stripping the solvent from said substantially mineral-free, water-free oil-solvent solution.

6. A method of dehydrating and demineralizing water containing oil emulsions obtained from bituminous oil-bearing sources, which method comprises:
 (a) diluting the oil emulsion with a hydrocarbon solvent which is a solvent for the bituminous oil with the bituminous components therein and forms a minimum-boiling point azeotrope with water;
 (b) distilling an azeotropic mixture of said solvent and water from said diluted oil emulsion of (a) to remove the water therefrom as a constant boiling mixture comprising said water and said solvent, said constant boiling mixture containing a greater quantity of said solvent than said water thereby obtaining an oil-solvent solution comprising an oil-solvent phase containing oil-wet mineral matter therein, said azeotropic dehydration being carried out without waiting for said diluted oil emulsion to separate into a layered system;
 (c) collecting the azeotropic distillate obtained from (b), said distillate comprising a solvent phase and an aqueous phase;
 (d) separating the oil-wet mineral matter from the oil-solvent solution and withdrawing said oil-solvent solution;

(e) washing the oil-wet mineral matter recovered in (d) with solvent thereby removing the oil from said mineral matter and withdrawing said solvent wash comprising an oil-solvent solution;

(f) stripping off the wash solvent remaining in the oil-free mineral matter obtained in (e) and removing and discarding the oil-free, solvent-free mineral matter;

(g) stripping the solvent from the oil-solvent solution withdrawn in (d) and (e) and recovering an oil product substantially free of water, solvent and mineral matter; and (h) stripping off the solvent dissolved in the aqueous phase of the azeotropic distillate collected in (c) and recovering a high purity water substantially free of oil, solvent and mineral matter.

7. A method according to claim 6 wherein the hydrocarbon solvent employed in step (a) is an aromatic hydrocarbon.

8. A method according to claim 6 wherein the oil-wet mineral matter of (d) is removed from the oil-solvent solution by gravity separation, the solvent in (g) is stripped off by distillation and the solvent in (f) and (h) is stripped off by steam.

9. A method according to claim 6 wherein a high boiling diluent is added to the recovered oil-solvent solution obtained in (d) and (e) to replace the solvent as it is being stripped off in (g) thereby recovering an oil-diluent solution substantially free of water, solvent and mineral matter.

10. A method according to claim 9, wherein the solvent is xylene and the diluent is a high boiling petroleum distillate.

11. A continuous method of dehydrating and demineralizing water containing oil emulsions obtained from bituminous oil-bearing sources, which method comprises:

(a) continuously diluting the oil emulsion with an aromatic hydrocarbon solvent which is a solvent for the bituminous oil with the bituminous components therein and forms a minimum-boiling point azeotrope with water;

(b) continuously azeotropically dehydrating said diluted oil emulsion of (a) to continuously remove the water therefrom, thereby obtaining an oil-solvent solution containing suspended oil-wet mineral matter therein, said azeotropic dehydration being carried out without waiting for said diluted oil emulsion to separate into a layered system and continuously adding additional solvent during said azeotropic dehydration;

(c) continuously collecting the azeotropic distillate obtained from (b), said distillate comprising a solvent phase and an aqueous phase and continuously withdrawing the mineral matter containing oil-solvent solution obtained in (b);

(d) continuously separating the oil-wet mineral matter from the mineral matter containing oil-solvent solution withdrawn in (c) and continuously withdrawing the separated mineral matter-free oil-solvent solution from said oil-wet mineral matter;

(e) continuously washing the oil-wet mineral matter recovered in (d) with solvent to remove said oil from said mineral matter and continuously transferring the solvent wash solution to the oil-solvent solution in (d);

(f) continuously stripping off the wash solvent remaining in the oil-free mineral matter, recovering said solvent and removing and discarding the oil-free, solvent-free mineral matter;

(g) continuously stripping off the solvent from the oil-solvent solution and continuously adding a high boiling diluent to said oil-solvent solution as said solvent is being stripped off, thereby continuously recovering an oil-diluent solution substantially free of water, solvent and mineral matter;

(h) continuously recovering the solvent stripped off in (g) for recycling in the process; and (i) continuously stripping off the solvent dissolved in the aqueous phase of said azeotrope distillate collected in (c), continuously recovering said stripped solvent for recycling in the process, continuously recovering the solvent phase of the azeotropic distillate for recycling in the process and continuously recovering a high purity water, substantially free of oil, solvent and mineral matter.

12. A continuous method according to claim 11 wherein the stripped off solvent recovered in (f) is continuously transferred to (b).

13. A method of dehydrating and demineralizing water containing oil emulsions obtained from bituminous oil-bearing sources, which comprises:

(a) diluting the oil emulsion with at least one hydrocarbon solvent which is a solvent for the bituminous oil with the bituminous components therein and forms a minimum-boiling point azeotrope with water;

(b) allowing said diluted oil emulsion to separate into a top layer, a second layer, and a bottom layer;

(c) azeotropically dehydrating said top layer thereby obtaining an oil-solvent solution containing oil-wet mineral matter, withdrawing the mineral matter containing oil-solvent solution and collecting the azeotropic distillate comprising a solvent phase and an aqueous phase;

(d) separating the oil-wet mineral matter from the oil-solvent solution obtained in (c) and withdrawing said oil-solvent solution;

(e) washing the oil-wet mineral matter recovered in (d) with solvent to remove the oil from said mineral matter and withdrawing the solvent wash solution from the resulting oil-free mineral matter;

(f) stripping off the wash solvent remaining in the oil-free mineral matter, withdrawing said stripped solvent for recycling and removing and discarding the oil-free, solvent-free mineral matter;

(g) stripping off the solvent from the oil-solvent solution and recovering an oil product substantially free of water, solvent and mineral matter;

(h) recovering the oil from the second layer obtained in (b);

(i) recovering the oil from the bottom layer obtained in (b), said bottom layer being an aqueous phase comprising oil, water and oil-wet mineral matter; and (j) stripping off the solvent dissolved in the aqueous phase of the azeotropic distillate collected in (c) for recycling, recovering the solvent phase of said azeotropic distillate for recycling and recovering a high purity water, substantially free of oil, solvent and mineral matter.

14. A method according to claim 13 wherein the oil in the aqueous bottom layer is removed from said layer in (i) by adding solvent to said layer thereby removing the oil from the oil-wet mineral matter in said layer and withdrawing the recovered oil-solvent solution for processing with the oil-solvent solution obtained in (d).

15. A method according to claim 14 including the steps of stripping off the solvent remaining in the oil-free mineral matter of the aqueous layer for recycling, removing and discarding the oil-free, solvent-free mineral matter and recovering a high purity water, substantially free of oil, solvent and mineral matter.

16. A method according to claim 14 wherein the pH of the aqueous bottom layer is lowered to increase the speed of settling of suspended mineral matter in said aqueous layer.

17. A method according to claim 13 wherein the oil is recovered from the second layer (h) by: (1) azeotropically dehydrating said layer to remove the water therefrom, (2) withdrawing the resulting oil-solvent solution, (3) washing the oil-wet mineral matter in said second layer to remove the oil therefrom, (4) withdrawing the solvent wash solution, (5) stripping off the solvent remaining in the oil-free mineral matter for recycling, and (6) stripping off the solvent from the oil-solvent solution.

18. A method according to claim 17 wherein the azeotropic dehydration of the second layer is carried out together with the azeotropic dehydration of the top layer in (c).

19. A continuous method of dehydrating and demineralizing water containing oil emulsions obtained from bituminous oil-bearing sources, which comprises:
  (a) continuously diluting the oil emulsion with at least one hydrocarbon solvent which is a solvent for the bituminous oil with the bituminous components therein and forms a minimum-boiling point azeotrope with water;
  (b) continuously separating said diluted oil emulsion into a top layer, a second layer, and a bottom layer and continuously separating said top and second layer from said bottom layer;
  (c) continuously azeotropically dehydrating said top layer and said second layer thereby obtaining an oil-solvent solution containing oil-wet mineral matter and continuously withdrawing said mineral matter containing oil-solvent solution;
  (d) continuously collecting the azeotropic distillate obtained in (c), said distillate comprising a solvent phase and an aqueous phase;
  (e) continuously separating the oil-wet mineral matter from the mineral matter containing oil-solvent solution withdrawn in (c) and continuously withdrawing the separated mineral matter-free oil-solvent solution from said oil-wet mineral matter;
  (f) continuously washing the oil-wet mineral matter with solvent to remove said oil from said mineral matter and continuously combining the resulting solvent wash solution with said oil-solvent solution withdrawn in (e);
  (g) continuously stripping off the wash solvent remaining in the resulting oil-free mineral matter, continuously combining said stripped-off solvent with the azeotropic distillate continuously collected in (d) and continuously removing and discarding the oil-free, solvent-free mineral matter;
  (h) continuously stripping the solvent from the oil-solvent solution, thereby continuously recovering an oil product substantially free of water, solvent and mineral matter;
  (i) continuously transferring the bottom layer obtained in (b) to a settling tower, said bottom layer being an aqueous phase comprising oil, water and oil-wet mineral matter;
  (j) continuously adding a solvent to the aqueous phase to remove the oil from the oil-wet mineral matters therein, thereby forming an oil-solvent to layer, the resulting oil-free mineral matter settling to the bottom of the aqueous phase;
  (k) continuously removing the oil-solvent solution top layer in (j) from the settling tower and continuously transferring said solution to (c) where said solution is azeotropically dehydrated;
  (l) continuously removing oil-free mineral matter from the aqueous phase and continuously recovering and discarding substantially oil-free, solvent-free mineral matter;
  (m) continuously stripping off the solvent from the aqueous phase recovered in (l), combining said solvent with the azeotropic distillate continuously collected in (d) and recovering a high purity water, substantially free of oil, solvent and mineral matter; and
  (n) continuously stripping off the solvent dissolved in the aqueous phase of the azeotropic distillate collected in (d), and recovering said solvent for recycling, continuously recovering the solvent phase of the azeotropic distillate for recycling and continuously recovering a high purity water, substantially free of oil-solvent and mineral matter.

20. A continuous method according to claim 19 including the step of continuously adding a high boiling diluent to the oil-solvent solution while the solvent is being continuously stripped off, thereby recovering an oil-diluent solution substantially free of water, solvent and mineral matter.

21. A continuous method of dehydrating and demineralizing water containing oil emulsions obtained from bituminous oil-bearing sources which comprises:
  (a) continuously diluting the oil emulsion with at least one hydrocarbon solvent which is a solvent for the bituminous oil with the bituminous components therein and forms a minimum-boiling point azeotrope with water;
  (b) continuously separating said diluted oil emulsion into a top layer, a second layer, and a bottom layer and continuously separating said top and second layer from said bottom layer;
  (c) continuously azeotropically dehydrating said top layer and said second layer, thereby obtaining an oil-solvent solution containing oil-wet mineral matter and continuously withdrawing said mineral matter containing oil-solvent solution;
  (d) continuously collecting the azeotropic distillate obtained in (c), said distillate comprising a solvent phase and an aqueous phase;
  (e) continuously separating the oil-wet mineral matter from the mineral matter containing oil-solvent solution withdrawn in (c) and continuously withdrawing the separated mineral matter-free oil-solvent solution from the oil-wet mineral matter;
  (f) continuously washing the oil-wet mineral matter with solvent to remove said oil from said mineral matter and continuously combining the resulting solvent wash solution with said oil-solvent solution withdrawn in (e);
  (g) continuously stripping off the wash solvent remaining in the resulting oil-free mineral matter, continuously combining said stripped-off solvent with the azeotropic distillate continuously collected in (d) and continuously removing and discarding the oil-free, solvent-free mineral matter;
  (h) continuously stripping the solvent from said oil-solvent solution, thereby continuously recovering an oil product substantially free of water, solvent and mineral matter;
  (i) continuously transferring the bottom layer obtained in (b) to a settling tower, said bottom layer being an aqueous phase comprising oil, water and oil-wet mineral matter;
  (j) continuously removing the oil-wet mineral matter from the aqueous phase by a separator which preferentially attracts the oil-wet mineral matter and continuously combining said recovered oil-wet mineral matter with the oil-wet mineral matter obtained in (e);
  (k) continuously removing the settled oil-free mineral matter in the aqueous phase of the bottom layer and discarding substantially oil-free, solvent-free mineral matter;
  (l) continuously stripping the solvent from the aqueous phase recovered in (k), combining said solvent with the azeotropic distillate continuously collected in (d) and recovering a high purity water, substantially free of oil, solvent and mineral matter;
  (m) continuously stripped off the solvent dissolved in the aqueous phase of the azeotropic distillate and recovering said solvent for recycling, continuously recovering the solvent phase of the azetropic distillate for recycling and continuously recovering a high purity water, substantially free of oil, solvent and mineral matter.

22. A continuous method of dehydrating virtually mineral-free, water containing oil emulsions obtained from bituminous oil-bearing sources, which method comprises:
   (a) continuously diluting the oil emulsion with a solvent which is a solvent for the bituminous oil with the bituminous components therein and forms a minimum-boiling point azeotrope with water;
   (b) continuously azeotropically dehydrating said diluted oil emulsion of (a) to remove the water therefrom as a constant boiling mixture in the vapor phase comprising said water and said solvent, said constant boiling mixture containing a greater quantity of said solvent than said water, and continuously withdrawing the resulting oil-solvent solution;
   (c) continuously collecting the azeotropic distillate obtained from (b), said distillate comprising a solvent phase and an aqueous phase;
   (d) continuously stripping off the solvent from the oil-solvent solution, recovering said solvent for recycling and continuously recovering an oil-product substantially free of water, solvent and mineral matter;
   (e) continuously stripping off the solvent dissolved in the aqueous phase of said azeotropic distillate for recycling, continuously recovering the solvent phase of said azetropic distillate for recycling and continuously recovering a high purity water, substantially free of oil, solvent and mineral matter.

23. A continuous method of dehydrating virtually mineral-free, water containing oil emulsions obtained from bituminous oil-bearing sources, which method comprises:
   (a) continuously azeotropically dehydrating the oil emulsion to remove the water therefrom, said azeotropic dehydration being carried out by contacting said oil emulsion with a hydrocarbon solvent which is a solvent for the oil with the bituminous components therein and forms an azeotrope with water, and continuously recovering an oil-solvent solution substantially free of water and mineral matter;
   (b) continuously collecting the azeotropic distillate from (a) said azeotropic distillate comprising a solvent phase and an aqueous phase said azetropic distillate comprising a constant boiling mixture of said solvent and said water, said solvent being present in said constant boiling mixture in a greater quantity than said water;
   (c) continuously stripping off the solvent from the oil-solvent solution, recovering said solvent for recycling and continuously recovering an oil product substantially free of water, solvent and mineral matter;
   (d) continuously stripping off the solvent dissolved in the aqueous phase of said azeotropic distillate for recycling, continuously recovering the solvent phase of said azetropic distillate for recycling and continuously recovering a high purity water, substantially free of oil, solvent and mineral matter.

24. A continuous method of dehydrating virtually mineral-free, water containing oil emulsions obtained from petroleum oil-bearing sources, which comprises:
   (a) continuously azeotropically dehydrating the oil emulsion to remove water therefrom, said dehydration being carried out in the presence of solvent vapors which form a minimum-boiling point azeotrope with water and continuously recovering an oil product substantially free of water, solvent and mineral matter;
   (b) continuously collecting the azeotropic distillate from (a) said distillate comprising a solvent phase and an aqueous phase;
   (c) continuously stripping off the solvent dissolved in the aqueous phase of said azeotrope distillate collected in (c), continuously recovering said stripped solvent for recycling in the process, continuously recovering the solvent phase of the azeotropic distillate for recycling in the process and continuously recovering a high purity water substantially free of oil, solvent and mineral matter.

References Cited
UNITED STATES PATENTS

| | | | |
|---|---|---|---|
| 2,185,710 | 1/1940 | Pearson | 208—187 |
| 2,235,639 | 3/1941 | Koch | 208—188 |
| 2,290,636 | 7/1942 | Deanesly | 208—348 |
| 2,324,240 | 7/1943 | Schaafsma | 208—348 |
| 2,362,093 | 11/1944 | Pyzel et al. | 208—187 |
| 2,368,497 | 1/1945 | Shipley et al. | 208—187 |
| 2,400,986 | 5/1946 | Voorhees | 208—188 |
| 3,211,643 | 10/1965 | Lenhart | 208—187 |

FOREIGN PATENTS 488,928  12/1952  Canada.

DELBERT E. GANTZ, Primary Examiner

G. J. CRASANAKIS, Assistant Examiner